(12) United States Patent
Willnauer

(10) Patent No.: US 10,039,377 B2
(45) Date of Patent: Aug. 7, 2018

(54) MUSIC LYRE FOR ELECTRONIC DISPLAY DEVICE

(71) Applicant: Kody Willnauer, Kansas City, KS (US)

(72) Inventor: Kody Willnauer, Kansas City, KS (US)

( * ) Notice: Subject to any disclaimer, the term of this patent is extended or adjusted under 35 U.S.C. 154(b) by 0 days.

(21) Appl. No.: 14/590,578

(22) Filed: Jan. 6, 2015

(65) Prior Publication Data

US 2015/0189983 A1 Jul. 9, 2015

Related U.S. Application Data

(60) Provisional application No. 61/925,078, filed on Jan. 8, 2014.

(51) Int. Cl.
*A47B 23/00* (2006.01)
*F16M 13/00* (2006.01)
*G10G 7/00* (2006.01)
*F16M 11/04* (2006.01)
*F16M 11/16* (2006.01)
*F16M 11/22* (2006.01)
*F16M 13/02* (2006.01)

(52) U.S. Cl.
CPC .......... *A47B 23/004* (2013.01); *F16M 11/041* (2013.01); *F16M 11/16* (2013.01); *F16M 11/22* (2013.01); *F16M 13/00* (2013.01); *F16M 13/02* (2013.01); *G10G 7/00* (2013.01)

(58) Field of Classification Search
CPC ... G10G 5/00; G10G 7/00; B42D 9/00; A47B 23/004; A47B 23/06; A47B 23/02; A47B 23/025; A47B 2200/0031; A47B 2200/05; A47B 96/061; A47B 5/02; A47B 57/42; A47B 96/028

USPC ....... 248/443, 441, 447, 454, 460, 461, 445, 248/346.07, 451, 917–923; 108/49, 152; 224/929, 930

See application file for complete search history.

(56) References Cited

U.S. PATENT DOCUMENTS

| | | | | |
|---|---|---|---|---|
| 922,610 | A | * | 5/1909 | Mills ............................ 248/443 |
| 1,041,277 | A | | 10/1912 | Hawley |
| 1,157,194 | A | * | 10/1915 | Tryens ......................... 248/443 |
| 1,195,110 | A | * | 8/1916 | Simhan ........................ 248/443 |
| 1,243,600 | A | | 10/1917 | Hambright |
| 1,400,217 | A | * | 12/1921 | Horger, Jr. ................. 248/444.1 |
| 2,234,086 | A | | 3/1941 | Rosebraugh |
| 3,365,164 | A | * | 1/1968 | Engels ......................... 248/443 |
| 3,437,002 | A | * | 4/1969 | Defauw et al. ................. 84/453 |
| 3,539,143 | A | | 11/1970 | Johnston |
| 3,544,056 | A | * | 12/1970 | Berquist ....................... 248/443 |
| 3,948,476 | A | * | 4/1976 | Kuniyosi ..................... 248/443 |
| 5,154,391 | A | * | 10/1992 | Hegarty ....................... 248/454 |
| 5,167,394 | A | * | 12/1992 | Hegarty ....................... 248/454 |
| 5,261,122 | A | * | 11/1993 | Otsuki et al. ................ 455/351 |
| 5,584,423 | A | * | 12/1996 | Wang ........................... 224/197 |

(Continued)

*Primary Examiner* — Nkeisha Smith
(74) *Attorney, Agent, or Firm* — Erickson Kernell IP, LLC

(57) ABSTRACT

Lyre capable of securing a readable electronic tablet or mobile device to a musical instrument is disclosed. The use of mobile device secured to the smart lyre negates the limited capacity of paper music or information the musician has available during a performance. The smart lyre, holding a tablet or smart phone enables the musician to access and view virtually unlimited amounts of electronic music and information, which can be updated repeatedly thus eliminating excess use of print and paper.

3 Claims, 3 Drawing Sheets

(56) References Cited

U.S. PATENT DOCUMENTS

| | | | |
|---|---|---|---|
| 7,041,890 B1 | 5/2006 | Sutton | |
| 7,172,167 B2* | 2/2007 | Phifer | A47B 23/042 |
| | | | 108/11 |
| 7,686,275 B2* | 3/2010 | Scarcello | 248/480 |
| 8,020,829 B1* | 9/2011 | Tamayori | 248/447.2 |
| 8,469,325 B2* | 6/2013 | Yu | 248/316.1 |
| 8,789,802 B2* | 7/2014 | Springer et al. | 248/181.1 |
| 8,887,975 B1* | 11/2014 | Basile et al. | 224/448 |
| 8,938,859 B1* | 1/2015 | Anklesaria | A45F 5/02 |
| | | | 224/255 |
| 2003/0106919 A1* | 6/2003 | Chuang | 224/420 |
| 2006/0290654 A1* | 12/2006 | Wang | 345/156 |
| 2008/0093837 A1* | 4/2008 | Lee | 281/46 |
| 2013/0105644 A1* | 5/2013 | Yu | 248/125.7 |
| 2013/0270411 A1* | 10/2013 | Taylor | 248/461 |
| 2015/0115123 A1* | 4/2015 | Ng | 248/451 |

\* cited by examiner

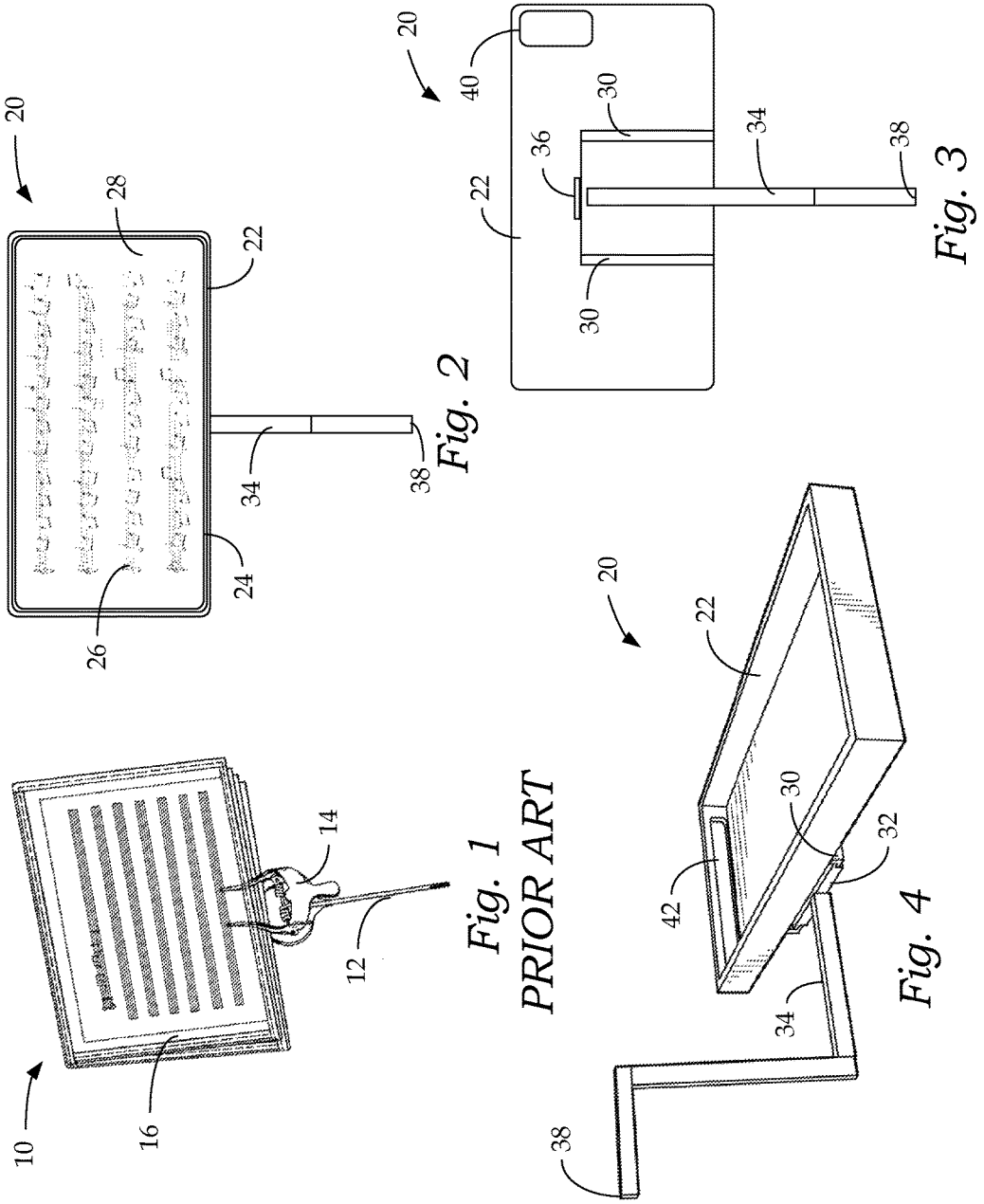

MUSIC LYRE FOR ELECTRONIC DISPLAY DEVICE

CROSS-REFERENCE TO RELATED APPLICATION

This application claims the benefit of provisional application Ser. No. 61/925,078, filed on Jan. 8, 2014, entitled "LYRE CAPABLE OF SECURING A READABLE ELECTRONIC TABLET OR MOBILE DEVICE TO A MUSICAL INSTRUMENT."

FIELD

The present invention relates to music lyres, and more particularly to a music lyre which holds an electronically powered tablet, smart phone, or other mobile media device, and stores and displays data of musical notation and other music-related media.

BACKGROUND

Traditionally, a marching band musician carries a music book (plastic folio folder), which contains dozens of paper-printed pages of sheet music, on a lyre attached to their musical instrument (trumpet, saxophone, drum, etc.). The lyre is typically a spring biased clip that grips the bottom of the folio. When the folios become packed with paper and gains excessive weight the entire device becomes cumbersome and unwieldy. The user becomes limited in the movement they have due to the possibility of the music and the device falling off or spilling its contents.

Paper folios containing dozens of printed pages of sheet music quickly acquire mass and bulk becoming difficult to manage and read during inclement weather when attached to the lyre. These conditions constrain the musician's mobility and musical performance while searching for specific music. Additionally, in windy conditions, the sheet music may blow or flip making it difficult for the musician to play the desired music.

SUMMARY

The invention replaces the traditional lyre with a "smart lyre" designed to hold an electronically powered tablet, smart phone, or other mobile media device, which stores and displays data of musical notation and other music-related media.

The use of mobile device secured to the smart lyre negates the limited capacity of paper music or information the musician has available during a performance. The smart lyre, holding a tablet or smart phone enables the musician to access and view virtually unlimited amounts of electronic music and information, which can be updated repeatedly thus eliminating excess use of print and paper.

DESCRIPTION OF THE DRAWINGS

FIG. 1 is a prior art lyre for supporting a music folio;

FIG. 2 is a front elevation view of the music lyre of the present invention;

FIG. 3 is a back elevation view of the music lyre of the present invention;

FIG. 4 is a perspective view of the music lyre of the present invention;

DETAILED DESCRIPTION

Referring initially to FIG. 1, a prior art musical instrument lyre 10 includes a support rod 12 secured to a clamp 14 for support paper sheet music or paper folio 16. The support rod 12 may be secured to a receiver (not show) attached to a musical instrument (not shown). The prior art musical instrument lyre 10 is not mechanically designed to securely hold a mobile or tablet device to an instrument. The use of paper sheet music for a musical ensemble creates storage issues; can be costly to print, heavy and contributes to the excessive use/waste of paper, unlike digitally stored media/music saved and stored in a mobile or tablet device attached to a smart lyre. A marching band musician carries a music book (plastic folio folder), which contains dozens of paper-printed pages of sheet music, on a lyre attached to their musical instrument (trumpet, saxophone, drum, etc.). When the folios become packed with paper and gains excessive weight the entire device becomes cumbersome and unwieldy. The user becomes limited in the movement they have due to the possibility of the music and the device falling off or spilling its contents. The present invention replaces the traditional lyre with a "smart lyre" designed to hold an electronically powered tablet, smart phone, or other mobile media device, which stores and displays data of musical notation and other music-related media. The invention claimed here solves this problem.

Figure 5:
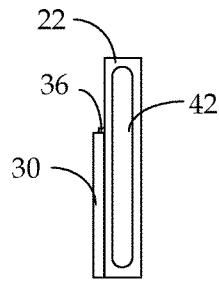
FIG. 5 is a side view of the case of the music lyre of the present invention.
Figure 6:
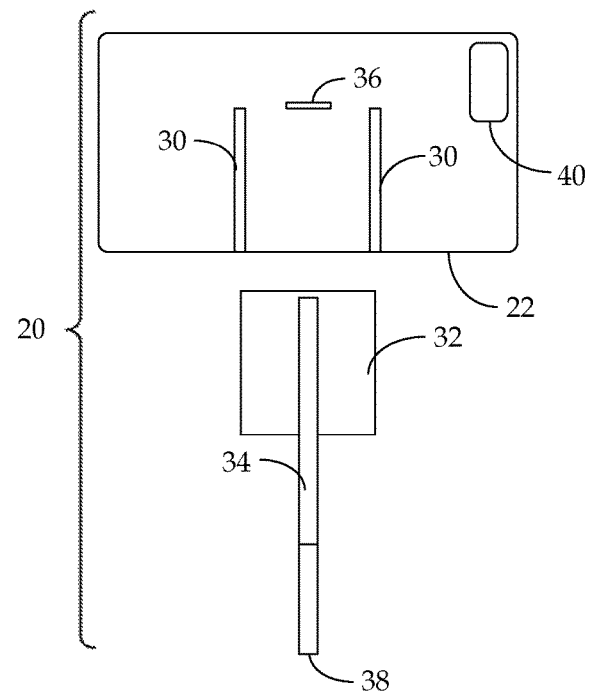
FIG. 6 is a back elevation view of the music lyre showing the case separated from the mounting plate.
Figure 7:
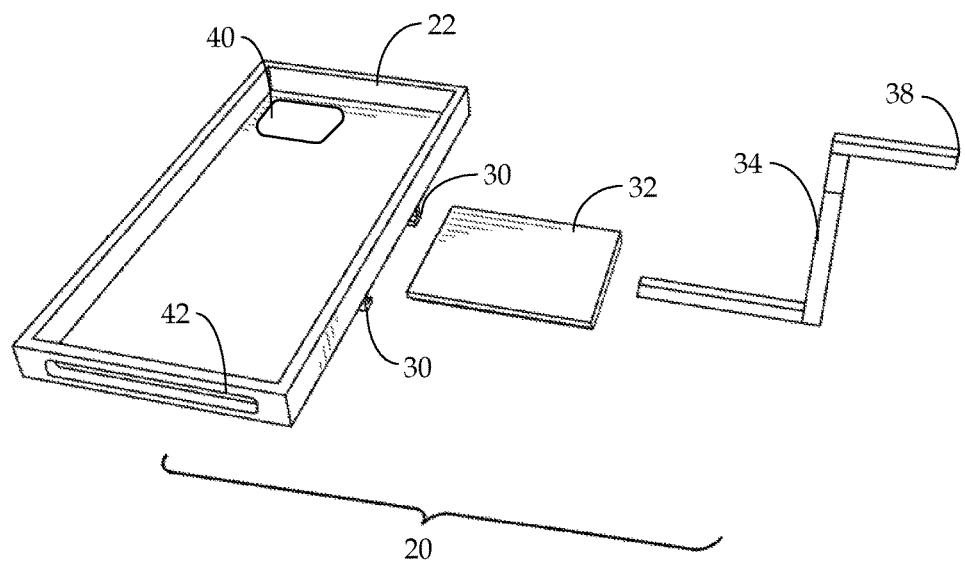
FIG. 7 is an exploded perspective view of the music lyre of the present invention.
Figure 8:
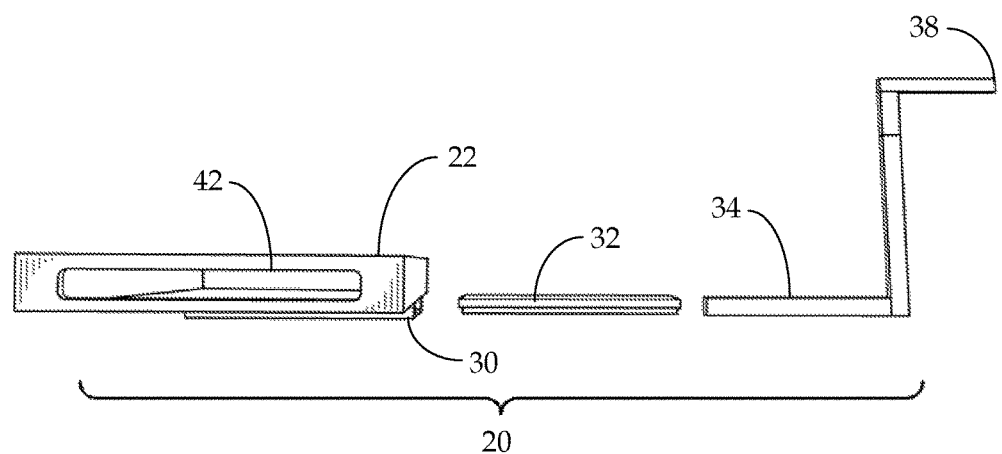
FIG. 8 is a side exploded perspective view of the music lyre of the present invention.
Figure 9:
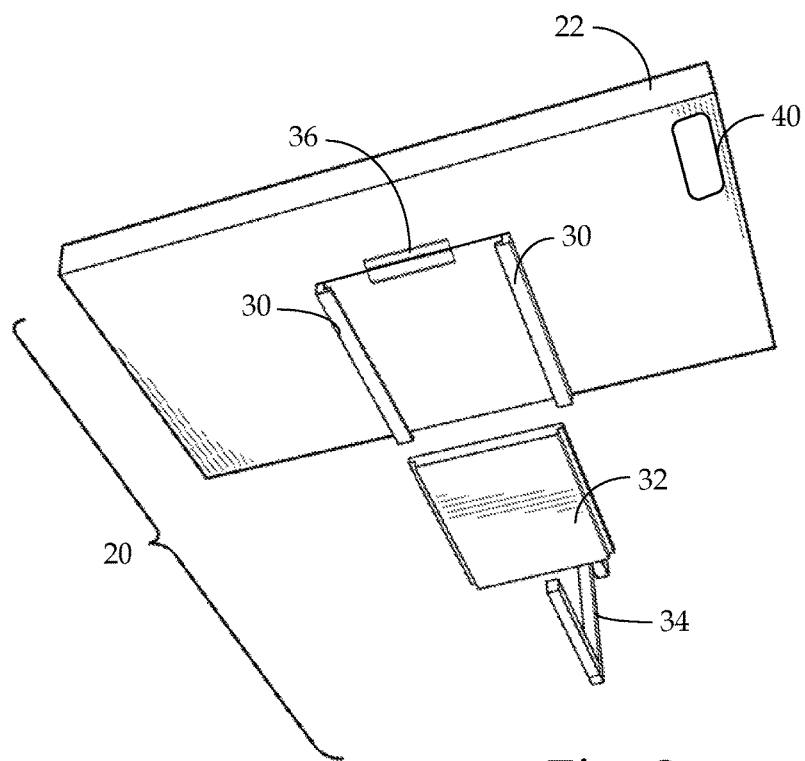
FIG. 9 is a back exploded perspective view of the music lyre of the present invention.

Referring to FIGS. 2-5, a music lyre of the present invention generally indicated by reference numeral 20. The music lyre 20 includes a case 22 adapted to support and secure a mobile electronic device 24. The musician places a mobile device 24 or tablet into the smart lyre 20, which is affixed to the musician's instrument (not shown) that permits the user to read musical notation 26 on the device/tablet's display screen 28 while simultaneously permitting the musician, while standing or marching, to observe the musical conductor. The smart lyre 20 also permits the user to view printed instructions; review or record performance video and audio for evaluation. Viewing material on the mobile device 24 or tablet eliminates weight and paper storage concerns for the user.

Also, it can allow a tablet or mobile device affixed to the invention to be able to produce an audio or visual record, as well as annotation on a mobile or tablet device while holding the musical instrument in a playing position.

The case 22 includes a hard rubber or plastic housing which may be coated with silicone or other soft rubber and is adapted and sized to receive a tablet and or mobile device 24. The case 22 provides a secure fit for the mobile device 24 ensuring the device 24 will not fall out of the case 22 during use. The back of the case 22 has raised parallel plastic rails 30 to allow the mobile enclosure to couple to a mounting plate 32 secured to the end of a mounting bracket 34. The back of the case 22 may also include a stop 36 to limit the mounting plate 32 from sliding through the rails 30. Each of the sides of the case 22, top, bottom left and right, have an equal depth to accommodate a tablet or mobile device 24.

The mounting plate 32 may be made of a hard plastic that provides a rigid mounting for the case 22 and mobile device 24 or electronic tablet. The mounting bracket 34 may be plastic or metal, and may be coated in silicone rubber. The mounting bracket 34 is secured to the mounting plate 32. A free end 38 of mounting bracket 34 is configured to be inserted into an open slot that is found universally mounted on almost all marching band instruments. The length of the mounting bracket 34 is determined according to each instrument's size and appropriate viewing distance.

The music lyre 20 provides a secure shell/mold for the mobile device 24 and holds and protects the mobile device 24 while it is being used. The tablet or mobile device's 24 screen 28 is visible and accessible to user control inputs. The sides of the case 22 surrounding the device allow physical inputs for headphones or other mobile or tablet components the user may attach while still having the mobile device 24 or tablet device secured and used.

The case 22 includes rails 30 on the back to allow easy joining and removal of the bracket 34 from the case. A user aligns the mounting plate 32 with the rails 30 of the case 22 to mate the case 22 to the mounting bracket that will be connected into the musical instrument opening.

The mounting bracket 34 may be angled, depending on the form and function of the musical instrument, as to allow it to be connected to an open slot/receiver that is found universally on almost all marching band instruments (not shown).

A mold of the case 22 may be designed to accept a tablet, smart phone, or other mobile device 24. The mounting bracket 34 may be permanently joined to the mounting plate 32 or may be releasably coupled to the mounting plate 32. Alternatively, the mounting plate 32 may be an integral part of the case 22 with a receiver for receiving an end of the mounting bracket 34 opposite the free end 38.

A secure fit of a tablet or mobile device 24 as well as a secure fit of the case 22 to the mounting bracket 34 that will support the weight of the device is desired. The video/data screen 28 of the device 24 should be viewable without obstruction while secured in the smart lyre 20. The mounting plate 32 that slides and connects to the back of the case 22 should fit firmly without allowing vibration between the bracket and the enclosure. The mounting bracket 34 should be of an appropriate thickness, strength, and angled correctly to equally fit in the open slot/receiver found universally on marching band instruments for readability (not shown).

Mold may be created to fit different tablet or mobile device sizes depending on the needs of the user. By making the tablet or mobile device case 22 and the mounting bracket 34 two different pieces, a user could may the case 22 from one mounting bracket 34 and quickly attach the tablet or mobile device in the shell to another mounting bracket 34 that can fit a different instrument. The appropriate use of one enclosure for a saxophone would not facilitate its use for a clarinet. The clarinet would need a ring mount to the body of the instrument. A marching drum would not need the bent right angles but rather a straight metal wire extending from its unique lyre input. The interchangeability provides variable uses to the musical instrument spectrum.

Musicians, college and secondary school musical ensembles may have their traditional paper sheet music electronically stored and available to view on a mobile device 24 they already own. The musician would place the mobile device 24 securely into the case 22 and attach the case to their instrument thus allowing the musician to read the musical notes 26 or information on device's display screen 28. A student musician using the musical lyre 20 in combination with a tablet or mobile device 24 may record the audio of their performance, annotate instructions, video graph their movement on a marching band field or any number of the musical abilities mobile devices 24 may provide. This invention allows modern electronic devices to be used in more depth than previous instrumental sheet music holding devices currently available. The present invention, in combination with the tablet or mobile device 24 eliminates the need for paper folios and facilitates a faster method of distributing music-related materials and related content to the musician and ensemble.

The music lyre 20 may include ports 40 and 42 in the case 22, which also allows a tablet or mobile device 24 to record the performance, as well as allow annotation on a mobile or tablet device while holding the musical instrument in a playing position.

It is to be understood that while certain forms of this invention have been illustrated and described, it is not limited thereto, except in so far as such limitations are included in the following claims and allowable equivalents thereof.

The invention claimed is:

1. A music lyre for supporting a mobile electronic device having a display for displaying data of musical notation, said music lyre comprising:
   a case having a top side, a bottom side, a left side, a right side, and a back forming a cavity for receiving and releasably securing the mobile electronic device;
   a mounting bracket having a first end, a mounting plate secured to said first end, and a free end configured to be received in a conventional lyre mounting slot of a musical instrument;
   a first port in said back of said case positioned for alignment with a camera on the back of the mobile electronic device and a second port in said right side of said case; and
   mounting rails secured to said back surface of said case for receiving said mounting plate of said mounting bracket;
   wherein said case includes a stop on said back surface of said case for limiting insertion of said mounting plate into said mounting rails;
   wherein said top side, said bottom side, said left side, and said right side are of equal depth and are sized for matching corresponding dimensions of the mobile electronic device without obstructing the display.

2. The music lyre of claim 1 wherein said case is configured to receive a smart phone.

3. The music lyre of claim 1 wherein said case is configured to receive an electronic tablet.

* * * * *